(12) United States Patent
Katano

(10) Patent No.: US 8,187,757 B2
(45) Date of Patent: May 29, 2012

(54) FUEL CELL SYSTEM INCLUDING A GAS-LIQUID SEPARATOR AND A CIRCULATION DEVICE

(75) Inventor: Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1163 days.

(21) Appl. No.: 11/996,538

(22) PCT Filed: Aug. 4, 2006

(86) PCT No.: PCT/JP2006/315495
§ 371 (c)(1),
(2), (4) Date: Jan. 23, 2008

(87) PCT Pub. No.: WO2007/020819
PCT Pub. Date: Feb. 22, 2007

(65) Prior Publication Data
US 2009/0280371 A1    Nov. 12, 2009

(30) Foreign Application Priority Data
Aug. 16, 2005  (JP) ................................ 2005-235912

(51) Int. Cl.
*H01M 8/06*  (2006.01)

(52) U.S. Cl. ...................................... 429/414; 429/408

(58) Field of Classification Search .......................... None
See application file for complete search history.

(56) References Cited

U.S. PATENT DOCUMENTS

| 6,117,577 A | 9/2000 | Wilson |
| 6,541,141 B1 | 4/2003 | Frank et al. |
| 6,582,843 B1 | 6/2003 | Heuser et al. |
| 2004/0023102 A1 | 2/2004 | Sugita et al. |
| 2004/0247984 A1 | 12/2004 | Ismaier et al. |
| 2005/0031932 A1 | 2/2005 | Hu |

(Continued)

FOREIGN PATENT DOCUMENTS

CN          1341284 A       3/2002

(Continued)

OTHER PUBLICATIONS

Machine translation of JP 2002-231294, Ito et al., Jan. 29, 2001.*

(Continued)

*Primary Examiner* — Barbara Gilliam
*Assistant Examiner* — Kwang Han
(74) *Attorney, Agent, or Firm* — Oblon, Spivak, McClelland, Maier & Neustadt, L.L.P.

(57) ABSTRACT

A compact fuel cell system capable of preventing water from remaining in a pipe is provided. The fuel cell system 1 includes a fuel cell 2, a fuel gas flow control device 3 for controlling the amount of fuel gas flowing from a fuel gas supply system, a gas-liquid separator 4 for separating water contained in an anode off gas discharged from the fuel cell 2, and a circulation device 5 which mixes an anode off gas discharged from the gas-liquid separator 4 and a fuel gas newly supplied by a fuel gas supply system, and supplies the mixed gas to the fuel cell 2. The gas-liquid separator 4 and the circulation device 5 are attached to an end plate 6 of the fuel cell 2 and the circulation device 5 is positioned higher than the gas-liquid separator 3.

17 Claims, 4 Drawing Sheets

U.S. PATENT DOCUMENTS

2007/0259243 A1 * 11/2007 Jufuku et al. .................. 429/34

FOREIGN PATENT DOCUMENTS

| | | |
|---|---|---|
| CN | 1581554 A | 2/2005 |
| DE | 199 00 166 C1 | 3/2000 |
| JP | 8 315843 | 11/1996 |
| JP | 11 97041 | 4/1999 |
| JP | 2000 285944 | 10/2000 |
| JP | 2002 231294 | 8/2002 |
| JP | 2002-367664 | 12/2002 |
| JP | 2004 168101 | 6/2004 |
| JP | 2004-192845 | 7/2004 |
| JP | 2005-5228 | 1/2005 |
| JP | 2005-141943 | 6/2005 |
| JP | 2005-259464 | 9/2005 |
| JP | 2006 114415 | 4/2006 |

OTHER PUBLICATIONS

Machine translation of JP 2002-231294, Ito et al., Aug. 16, 2002.*

* cited by examiner

FUEL CELL SYSTEM INCLUDING A GAS-LIQUID SEPARATOR AND A CIRCULATION DEVICE

TECHNICAL FIELD

The present invention relates to a fuel cell system, and more particularly, to a fuel cell system for circulating an anode off gas discharged from a fuel cell.

BACKGROUND ART

The fuel cell is configured such that an electrolyte membrane is sandwiched between an anode and a cathode. When hydrogen (fuel gas) is in contact with the anode and oxygen (oxidant gas) is in contact with the cathode, an electrochemical reaction occurs between the two electrodes, thereby generating an electromotive force.

In general, the fuel cell system supplies the fuel gas supplied from a high-pressure hydrogen tank to the anode, and at the same time supplies air drawn from outside by a compressor to the cathode. At this time, in order to reduce the amount of fuel gas to be newly supplied, an anode off gas discharged from the anode is circulated by a circulation device. The circulated anode off gas is mixed with a fuel gas newly supplied from outside and then the mixed gas is supplied to the anode.

However, there is a problem in that moisture contained in an anode off gas is condensed into water, which remains in a pipe for circulating the anode off gas, thereby reducing the amount of flowing anode off gas and thus failing to supply a predetermined amount of hydrogen to the fuel cell.

In view of this problem, there has been proposed a fuel cell device having a passage shut-off valve which is positioned higher than the anode off gas inlet between the anode off gas outlet of the fuel cell and the anode off gas inlet of the circulation device (see Japanese Patent Laid-Open No. 2002-231294). According to this device, the flow of hydrogen can be prevented from being blocked by water in a pipe in which an anode off gas is circulated.

DISCLOSURE OF THE INVENTION

Unfortunately, the above device cannot meet the recent demands for more compact devices since the entire device becomes larger in size.

In view of the above problem, the present invention has been made. In other words, it is an object of the present invention to provide a more compact fuel cell system capable of preventing water from remaining in a pipe.

Further objects and advantages of the present invention will be apparent from the following description.

A fuel cell system according to the present invention including a fuel cell, a fuel gas supply system for supplying a fuel gas to an anode of the fuel cell, a gas-liquid separator for separating water contained in an anode off gas discharged from the fuel cell, and a circulation device for circulating an anode off gas discharged from the gas-liquid separator to supply the anode off gas to the fuel cell; and the fuel cell system is characterized in that the gas-liquid separator and the circulation device are attached to an end plate of the fuel cell; and the circulation device is positioned higher than the gas-liquid separator.

The gas-liquid separator is disposed directly under the circulation device, preferably downward in a vertical direction thereof.

The circulation device can be a circulation pump, and the anode off gas and the fuel gas join together preferably in the vicinity of a gas discharge outlet of the circulation pump.

The circulation device can be an ejector.

In the case of the fuel cell system further including a fuel gas flow control device for controlling the amount of fuel gas flowing from the fuel gas supply system, the fuel gas flow control device is preferably disposed directly under the circulation device.

The fuel cell system preferably includes a stepped portion which is positioned higher than a joining portion of a pipe extending from the fuel gas flow control device to the joining portion where the anode off gas and the fuel gas join together. In this case, the stepped portion can be included in a part of a shape having spring characteristics. Wherein, preferably, a curved portion which is convexly curved downward is disposed in the pipe between the joining portion and the stepped portion, and a heat generating member is disposed in the vicinity of the curved portion.

In the case of the fuel cell system further including a fuel gas flow control device for controlling the amount of fuel gas flowing from the fuel gas supply system, a curved portion which is convexly curved downward is preferably disposed in a pipe extending from the fuel gas flow control device to the joining portion where the anode off gas and the fuel gas join together. Preferably, the curved portion is included in a part of a shape having spring characteristics.

The fuel gas flow control device can be a regulator, a shut valve, or an injector.

According to the present invention, a gas-liquid separator and a circulation device are attached to an end plate of the fuel cell, thereby enabling an efficient use of space and providing a more compact device. Additionally, the circulation device is positioned higher than the gas-liquid separator and thus even if moisture is condensed into water inside the circulation device, the water is dropped into the gas-liquid separator, thereby preventing the water from remaining inside the circulation device.

BEST MODE FOR CARRYING OUT THE INVENTION

Figure 1:
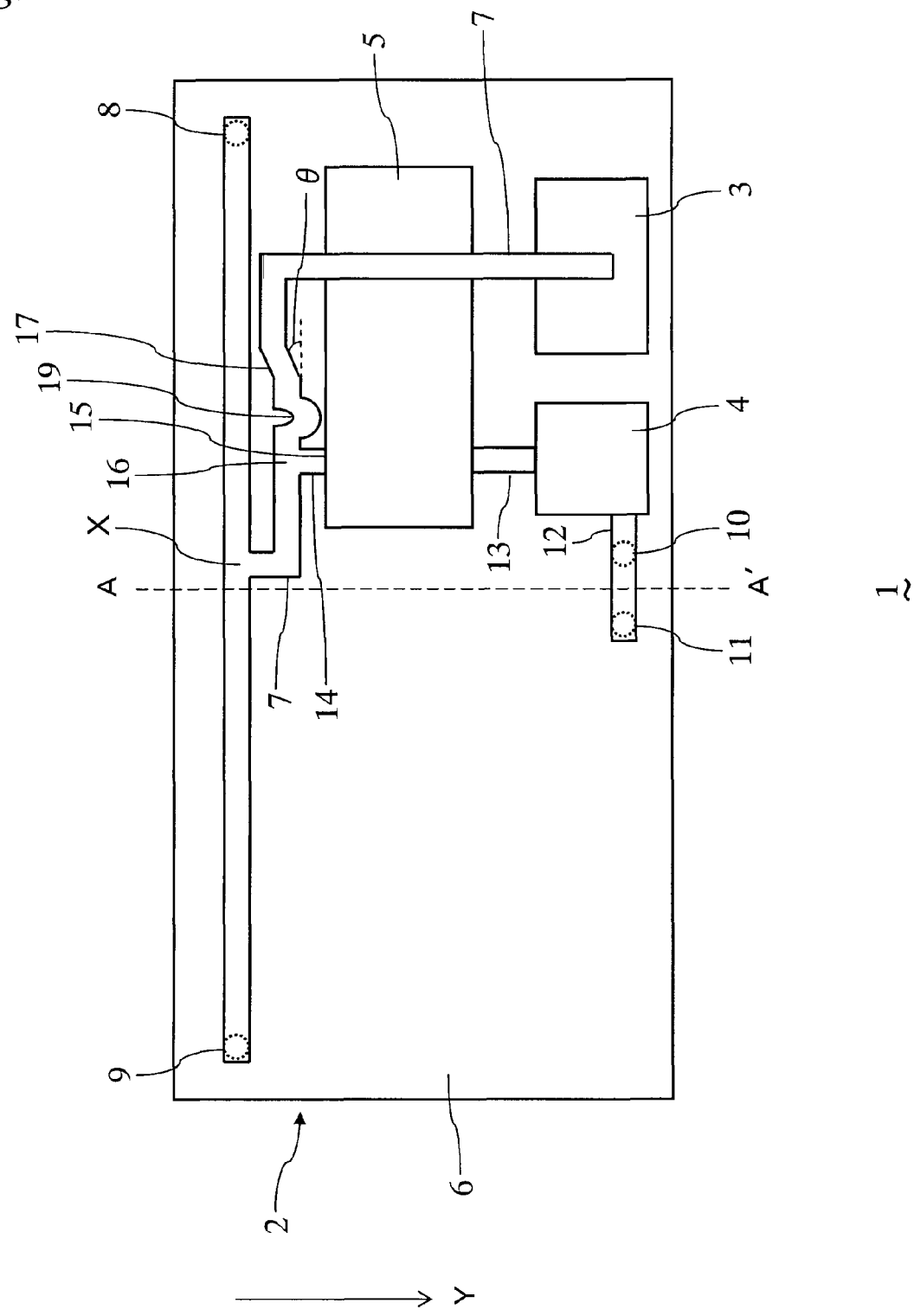
FIG. 1 is a schematic side view of the fuel cell system in accordance with the present embodiment.

FIG. 1 is a schematic side view of the fuel cell system in accordance with the present embodiment. It should be noted that this fuel cell system is suitable for vehicular use, but is also applicable to stationary and other applications.

As shown in FIG. 1, the fuel cell system 1 includes a fuel cell 2 which generates a electromotive force by a fuel gas and a oxidant gas; a fuel gas flow control device 3; a gas-liquid separator 4 which separates water from anode off gases discharged from the fuel cell 2; and a circulation device 5 which circulates an anode off gas discharged from the gas-liquid separator 4 to be supplied to the fuel cell 2. The fuel gas flow control device 3 is connected to a fuel gas supply system (not shown) and controls such that an optimum amount of fuel gas should be supplied from the fuel gas supply system to the anode.

For example, a regulator, a shut valve, or an injector may be used as the fuel gas flow control device 3. Additionally, according to the present embodiment, a circulation pump is used as the circulation device 5. It should be noted that the present invention is not limited to this, but for example, an ejector may be used instead of the circulation pump.

In FIG. 1, the fuel cell 2 is configured such that a fuel cell stack (not shown) is arranged in parallel right and left of the center line A-A'. Here, the fuel cell stack is configured such that a plurality of cells (for example 20 cells) are stacked. Additionally, a cell is configured such that an electrolyte membrane is sandwiched between a pair of electrodes consisting of an anode and a cathode. It should be noted that the fuel cell stack may be formed by stacking a plurality of cells to form a sub stack and further stacking the plurality of sub stacks. A terminal, an insulator, and an end plate are disposed at both ends in the stacking direction of the cells and these are fixed to form the fuel cell 2.

According to the present embodiment, the fuel gas flow control device 3, the gas-liquid separator 4, and the circulation device 5 are attached to the end plate 6 of the fuel cell 2. This configuration allows the fuel cell system 1 to be compact by an efficient use of the space thereof.

The fuel gas to be supplied to the anode may be a hydrogen gas or a hydrogen-rich reformed gas generated by a reforming reaction of hydrocarbon related compounds. When a hydrogen gas is supplied, the fuel gas supply system may be configured by use of a hydrogen tank containing dry hydrogen in a high pressure state. When a reformed gas is supplied, a tank containing hydrocarbon related compounds and a reformer for reforming the hydrocarbon related compounds into hydrogen may be used.

A fuel gas supplied from the fuel gas supply system goes through a pipe 7 and is branched at a branch point x. Then, the fuel gas is supplied from each of the supply inlets 8 and 9 to a supply manifold (not shown) of each fuel cell stack. Next, the fuel gas supplied from each supply manifold to an anode of each cell electrochemically reacts with an oxidizing gas such as air supplied to the cathode through an electrolyte membrane. Then, an unreacted fuel gas is discharged as an anode off gas from the discharge outlets 10 and 11 through a discharge manifold (not shown).

An anode off gas discharged from the fuel cell 2 goes through a pipe 12 to the gas-liquid separator 4, in which water is removed. Then, the anode off gas goes through a pipe 13 to the circulation device 5. The anode off gas discharged from the circulation device 5 goes through a pipe 14 and then to a pipe 7, in which the anode off gas joins together with a fuel gas newly supplied from the fuel gas supply system 3. Then, the anode off gas and the fuel gas are mixed into a mixed gas which is supplied to the anode of the fuel cell 2. This recycling use of anode off gases can reduce the amount of fuel gas to be newly supplied.

The present embodiment is characterized in that the circulation device 5 is positioned higher than the gas-liquid separator 4. In other words, the circulation device 5 is above the gas-liquid separator 4 with respect to an axis parallel to a gravitational direction (y direction in FIG. 1). In this configuration, even if moisture is condensed into water inside the circulation device 5, the water falls into the gas-liquid separator 4, thereby preventing water from remaining inside the circulation device 5.

As shown in FIG. 1, the gas-liquid separator 4 is disposed directly under the circulation device 5, preferably downward in a vertical direction thereof. This configuration allows the gas-liquid separator 4 to be placed in a space generated by moving the circulation device 5 to a higher position, thus enabling an effective use of space. Additionally, in this case, preferably the circulation device 5 is configured such that the gas discharge outlet 15 is upward. In this configuration, even if moisture is condensed into water in the vicinity of the gas discharge outlet 15 of the circulation device 5, the water falls into the gas-liquid separator 4 passing through the circulation device 5, thereby preventing water from remaining in the pipes (14 and 7) upstream of the circulation device 5.

Additionally, when an anode off gas is mixed with a fuel gas and the temperature of the anode off gas is lowered, moisture is condensed into water in the vicinity where these gases join together. According to the present embodiment, as shown in FIG. 1, a joining portion 16 is preferably disposed in the vicinity of the gas discharge outlet 15 of the circulation device 5. In this configuration, water produced in the vicinity of the joining portion 16 goes through inside the circulation device 5 and falls into the gas-liquid separator 4, thereby preventing water from remaining in the pipe 7 of the circulation device 5.

According to the present embodiment, the fuel gas flow control device 3 is also disposed directly under the circulation device 5, preferably downward in a vertical direction thereof. This configuration also enables an effective use of space generated by moving the circulation device 5 to a higher position. Additionally, the length of the pipe 7 extending from the fuel gas flow control device 3 to the joining portion 16 can be shortened by disposing the fuel gas flow control device 3 directly under the circulation device 5.

Figure 2:
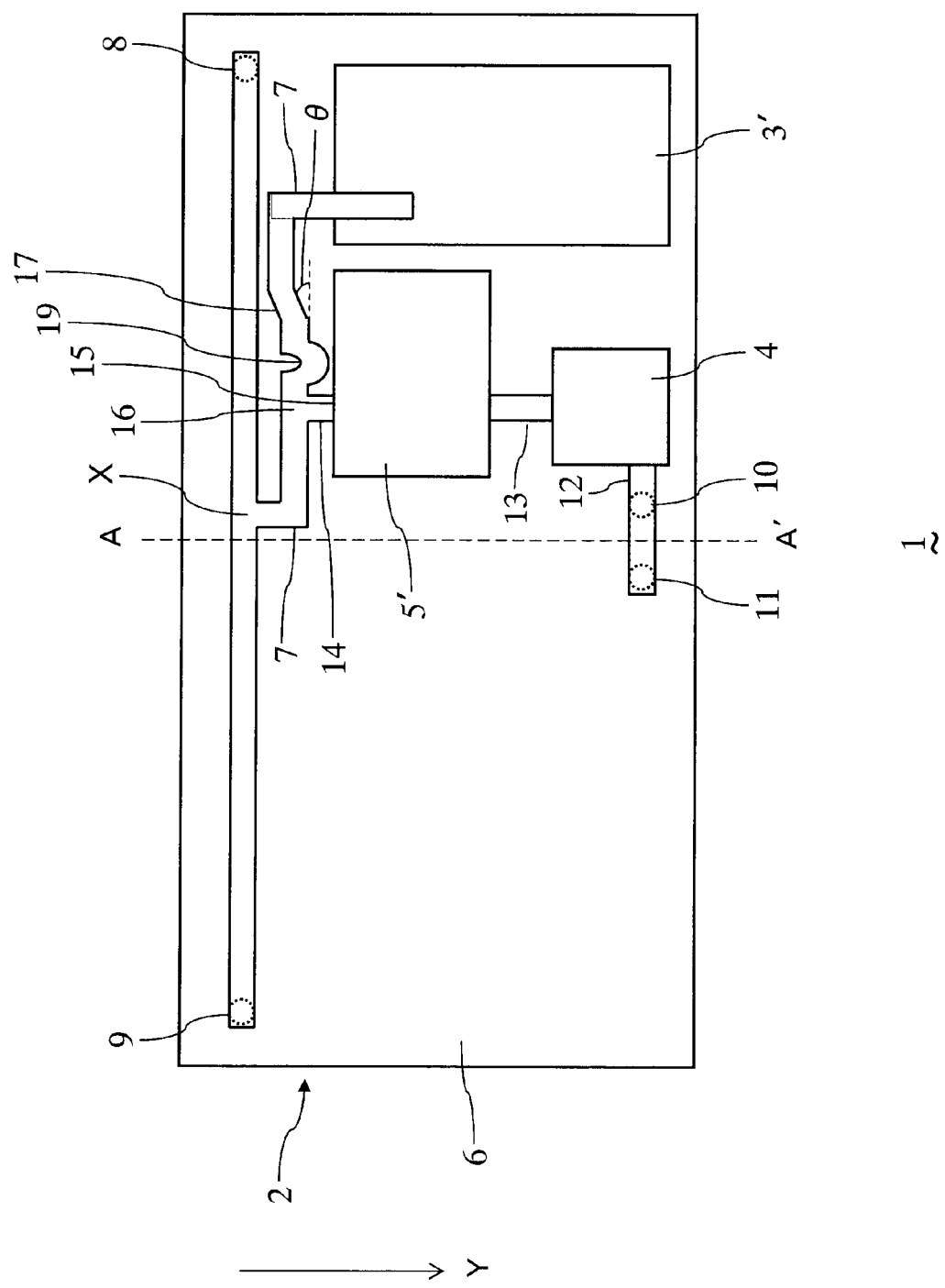
FIG. 2 is other schematic side view of the fuel cell system in accordance with the present embodiment.

It should be noted that the present embodiment is not limited to the configuration of FIG. 1, but as shown in FIG. 2, the fuel gas flow control device 3' may be disposed beside the circulation device 5'. Note that in FIG. 2, the same components as in FIG. 1 are indicated by the same symbols. In addition, in FIG. 2, the circulation device 5' and the gas-liquid separator 4, and the fuel gas flow control device 3' may be disposed symmetrically with respect to the center line A-A'.

Additionally, a stepped portion 17 positioned higher than the joining portion 16 is preferably disposed in the pipe 7 extending from the fuel gas flow control device 3 to the joining portion 16 (in FIG. 1, the stepped portion 17 having an upward slope toward the fuel gas flow control device 3). In this configuration, even if a dew condensation occurs in a pipe extending from the joining portion 16 to the fuel cell 2 after the fuel cell system stops its operation, water can be prevented from flowing into the fuel gas flow control device 3.

In addition, when the fuel cell system 1 is mounted in a vehicle, the tilt angle θ of the stepped portion 17 is preferably greater than or equal to an allowable tilt angle of the vehicle (more specifically 20 to 30 degrees). In this configuration, even in a state where the vehicle is inclined, water can be prevented from flowing over the stepped portion 17 into the fuel gas flow control device 3.

In addition, when a vibration-generating-device such as a pump is used to circulate a cathode off gas, the stepped portion is preferably included in a part of a shape having spring characteristics. More specifically, a U-shaped curved portion is preferably disposed a part of the pipe 7 extending from the fuel gas flow control device 3 to the joining portion 16.

Figure 3:
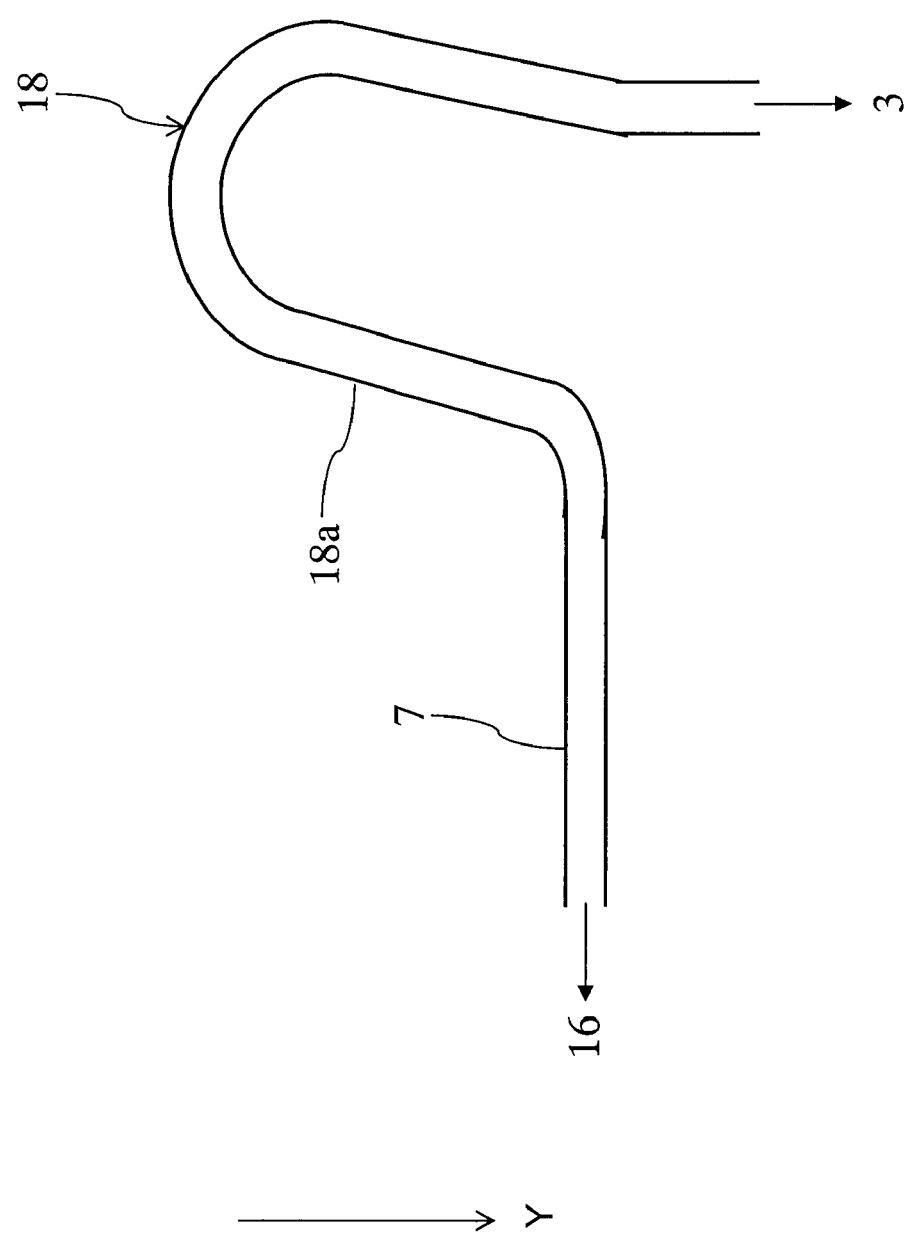
FIG. 3 is a schematic view of the curved portion provided between a fuel gas flow control device and a joining portion.

FIG. 3 is a partially enlarged view of the curved portion 18 provided in the pipe 7. The curved portion 18 includes a stepped portion 18a having an upward slope toward the fuel gas flow control device 3. Accordingly, even if a dew condensation occurs in a pipe extending from the joining portion 16 to the fuel cell 2, water can be prevented from flowing into the fuel gas flow control device 3. Further, the curved portion 18 having spring characteristics absorbs vibrations of a pump, thereby preventing the vibrations from being transmitted to the fuel gas flow control device 3. Additionally, the distance from the fuel gas flow control device 3 to the joining portion 16 is increased, thereby preventing the heat generated by the pump from being transmitted to the fuel gas flow control device 3.

In addition, according to the present embodiment, a portion lower than the joining portion 16 is preferably disposed between the stepped portion 17 and the joining portion 16 in FIG. 1. Here, the portion lower than the joining portion 16 refers to a curved portion 19 which is convexly curved downward as shown in FIG. 1. This portion can effectively prevent water from flowing from the joining portion 16 to the fuel gas flow control device 3.

In addition, the curved portion 19 is preferably disposed in the vicinity of a heat generating portion inside the fuel cell system. In this configuration, when water is frozen in the curved portion 19 or in the vicinity of the curved portion 19, the pipe 7 can be prevented from being blocked by the ice. Additionally, even if water is frozen, the ice can be easily thawed by the transmission of heat from the heat generating portion. It should be noted that examples of the heat generating portion includes a motor portion of the pump used as the circulation device 5.

Further, according to the present embodiment, as shown in FIG. 1, the gas discharge outlet 15 of the circulation device 5 is preferably disposed as close as possible to the center line A-A'. This arrangement allows gases to be delivered as evenly as possible across the fuel cell stacks which are disposed in parallel right and left. Additionally, the joining portion 16 is provided in the vicinity of the gas discharge outlet 15, which provides room between the joining portion 16 and the fuel gas flow control device 3. Thus, the stepped portion 17 and the curved portion 19 can be easily placed therebetween.

It should be noted that the present invention is not limited to the above embodiment, but various modifications can be made without departing from the sprit of the present invention.

Figure 4:
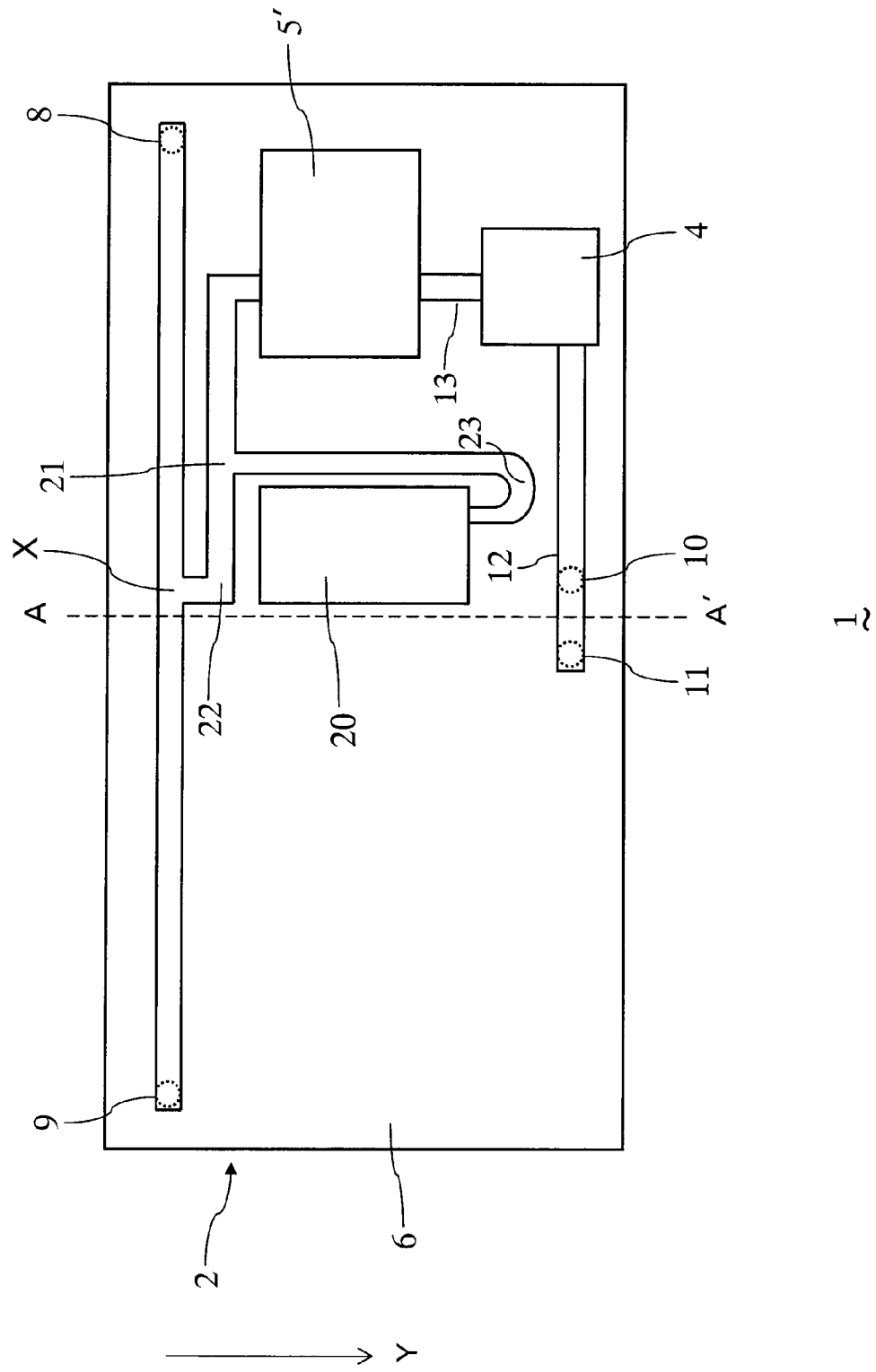
FIG. 4 is other schematic side view of the fuel cell system in accordance with the present embodiment.

For example, as shown in FIG. 4, a curved portion 23 which is convexly curved downward may be disposed in a pipe 22 extending from the fuel gas flow control device 20 to the joining portion 21 where an anode off gas and a fuel gas join together. In this case, the curved portion 23 is preferably included in a part of a shape having spring characteristics. Note that in FIG. 4, the same components as in FIG. 2 are indicated by the same symbols. In addition, in FIG. 4, the circulation device 5' and the gas-liquid separator 4, and the fuel gas flow control device 20 may be disposed symmetrically with respect to the center line A-A'.

The invention claimed is:

1. A fuel cell system comprising:
    a fuel cell;
    a fuel gas supply system for supplying a fuel gas to an anode of said fuel cell;
    a gas-liquid separator for separating water contained in an anode off gas discharged from said fuel cell; and
    a circulation device for circulating an anode off gas discharged from said gas-liquid separator to supply the anode off gas to said fuel cell,
    wherein said gas-liquid separator and said circulation device are attached to an end plate of the fuel cell;
    said circulation device is positioned higher than said gas-liquid separator; and
    the anode off gas discharged from said fuel cell goes through said gas-liquid separator and then joins with a fuel gas.

2. The fuel cell system according to claim 1, wherein said gas-liquid separator is disposed directly under said circulation device.

3. The fuel cell system according to claim 1, wherein said circulation device is a circulation pump, and the anode off gas and the fuel gas join together in a joining portion of a pipe above a gas discharge outlet of said circulation pump.

4. The fuel cell system according to claim 1, wherein said circulation device is an ejector.

5. The fuel cell system according to claim 1, further comprising a fuel gas flow control device for controlling the amount of fuel gas flowing from said fuel gas supply system, wherein said fuel gas flow control device is disposed directly under said circulation device.

6. The fuel cell system according to claim 5, further comprising a pipe that includes a stepped portion which is positioned higher than a joining portion of the pipe, the pipe extending from said fuel gas flow control device to the joining portion where the anode off gas and the fuel gas join together.

7. The fuel cell system according to claim 6, wherein said stepped portion is included in a part of the pipe that includes a shape providing the part of the pipe with spring properties.

8. The fuel cell system according to claim 6, wherein the pipe includes a curved portion which is convexly curved downward and is disposed between said joining portion and said stepped portion, and a heat generating member is disposed adjacent to said curved portion.

9. The fuel cell system according to claim 1, further comprising a fuel gas flow control device for controlling the amount of fuel gas flowing from said fuel gas supply system, wherein a curved portion which is convexly curved downward is disposed in a pipe extending from said fuel gas flow control device to the joining portion where the anode off gas and the fuel gas join together.

10. The fuel cell system according to claim 9, wherein said curved portion is included in a part of the pipe that includes a shape providing the part of the pipe with spring properties.

11. The fuel cell system according to claim 5, wherein said fuel gas flow control device is a regulator, a shut valve, or an injector.

12. The fuel cell system according to claim 1, further comprising a fuel gas flow control device for controlling the amount of fuel gas flowing from said fuel gas supply system, wherein a pipe extends from said fuel gas flow control device to a joining portion of the pipe where said anode off gas and said fuel gas join together, and at least a part of a lower surface of the pipe is positioned higher than a top surface of the pipe at a lowest position of a curved portion of the pipe.

13. The fuel cell system according to claim 1, further comprising:
    a pipe including a joining portion where said anode off gas and said fuel gas join together, the joining portion being above said circulation device in the gravitational direction, such that water at the joining portion falls through said circulation device and into said gas-liquid separator.

14. The fuel cell system according to claim 6, wherein said stepped portion forms an angle relative to a horizontal that is greater than or equal to an allowable vehicle tilt angle relative to the horizontal.

15. The fuel cell system according to claim 14, wherein the allowable vehicle tilt angle includes a range from 20° to 30°.

16. A fuel cell system comprising:

a fuel cell;

means for supplying a fuel gas to an anode of said fuel cell;

means for separating water contained in an anode off gas discharged from said fuel cell; and means for circulating an anode off gas discharged from said separating means to supply the anode off gas to said fuel cell, wherein said separating means and said circulating means are attached to an end plate of the fuel cell, said circulating means is positioned higher than said separating means, and the anode off gas discharged from said fuel cell goes through said separating means and then joins with a fuel gas.

17. A fuel cell system comprising:

a fuel cell;

a fuel gas supply system for supplying a fuel gas to an anode of the fuel cell;

a gas-liquid separator for separating water contained in an anode off gas discharged from the fuel cell;

a circulation device for circulating an anode off gas discharged from the gas-liquid separator to supply the anode off gas to the fuel cell, the circulation device being a circulation pump; and a pipe, wherein the gas-liquid separator and the circulation device are attached to an end plate of the fuel cell, the circulation device is positioned higher than the gas-liquid separator, the anode off gas discharged from the fuel cell goes through the gas-liquid separator and then joins with a fuel gas in a joining portion of the pipe above a gas discharge outlet of the circulation device, a fuel gas flow control device is attached to the end plate, the fuel gas flow control device is provided for controlling the amount of fuel gas flowing from the fuel gas supply system, and the fuel gas flow control device is disposed directly under the circulation device, and the pipe extends from the fuel gas flow control device to the joining portion where the anode off gas and the fuel gas join together, the pipe includes a stepped portion, and the stepped portion is positioned higher than the joining portion.

* * * * *